(12) United States Patent
Takaki et al.

(10) Patent No.: US 6,482,542 B1
(45) Date of Patent: Nov. 19, 2002

(54) INTEGRATED SEALED SECONDARY BATTERY

(75) Inventors: Mitsugu Takaki, Toyohashi (JP); Shinsuke Fukuda, Toyohashi (JP); Shinichi Yuasa, Kyotanabe (JP); Shinji Hamada, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/516,556

(22) Filed: Feb. 29, 2000

(30) Foreign Application Priority Data

Mar. 3, 1999 (JP) ............................................ 11-055612
Mar. 3, 1999 (JP) ............................................ 11-055614

(51) Int. Cl.$^7$ .............................................. H01M 10/50
(52) U.S. Cl. ........................ 429/120; 429/163; 429/62; 429/72; 429/73; 429/176
(58) Field of Search ................................. 429/120, 163, 429/176, 62, 72, 73

(56) References Cited

U.S. PATENT DOCUMENTS 3,745,048 A * 7/1973 Dinkler et al. .............. 136/166
5,589,290 A 12/1996 Klink et al.
5,641,589 A * 6/1997 Grivel et al. ................ 429/120

FOREIGN PATENT DOCUMENTS

| EP | 0834952 | 4/1998 |
|---|---|---|
| FR | 2694136 | 1/1994 |
| JP | 61-45571 | 3/1986 |
| JP | 6-215804 | 8/1994 |
| JP | 7-85847 | 3/1995 |

* cited by examiner

Primary Examiner—Steven P. Griffin
Assistant Examiner—Angela J. Martin
(74) Attorney, Agent, or Firm—Jordan and Hamburg LLP

(57) ABSTRACT

In an integrated sealed secondary battery 1 in which a plurality of cells 2 are arranged in a row, cooling medium passages 21 are formed on both sides of the row of the cells 2, and cooling medium passages 18 are formed between adjacent cells such as to effect communication between the cooling medium passages 21, 21 on both sides. The cross-sectional areas of the cooling medium passages 21, 21 on both sides are made different so as to generate pressure difference at both ends of the cooling medium passages 18 between the cases. The cooling medium passages 21 on both sides are formed in a meandering manner by the provision of projection strips that extend alternately downwards from the top wall and upwards from the bottom wall of the cooling medium passages 21.

16 Claims, 15 Drawing Sheets

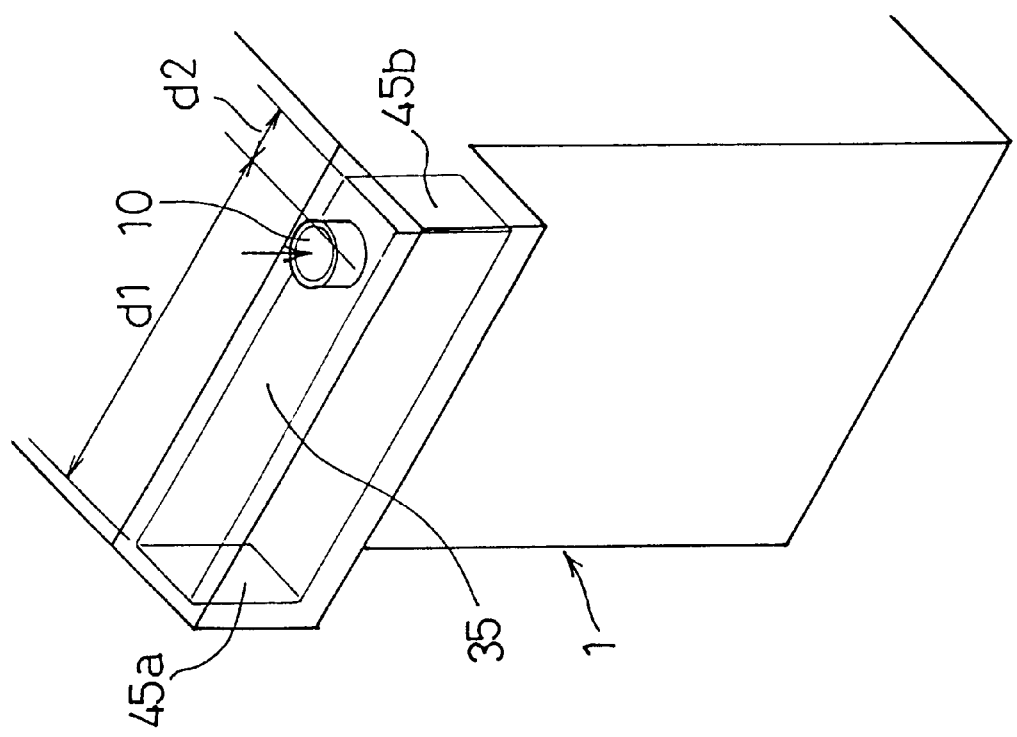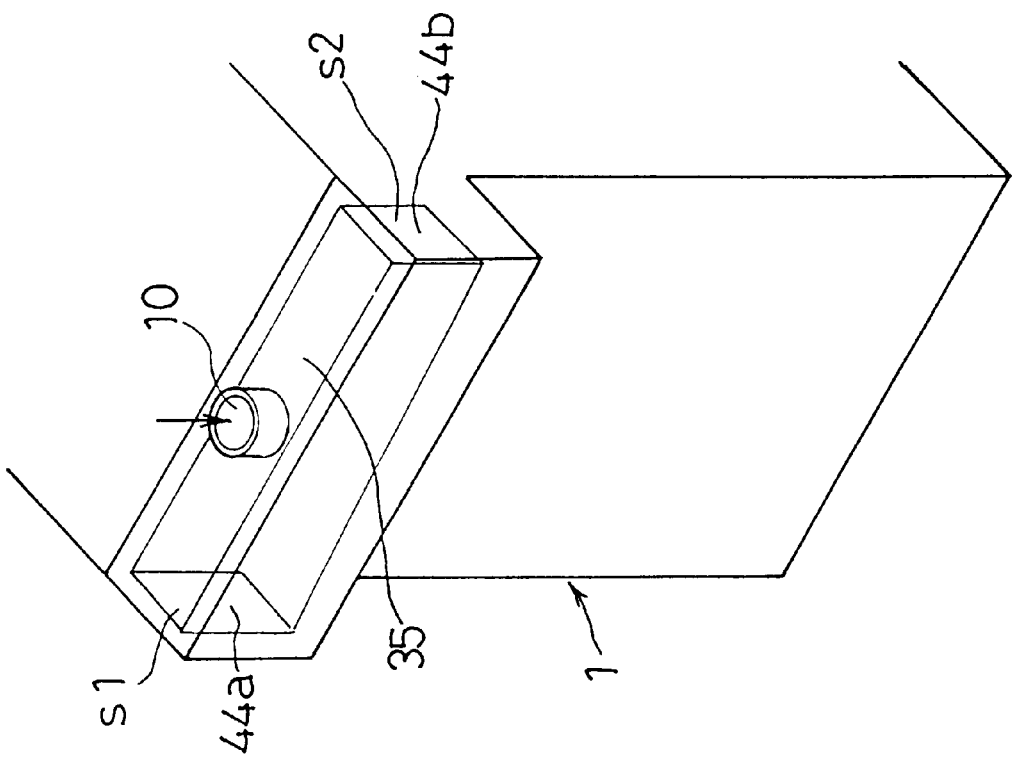

INTEGRATED SEALED SECONDARY BATTERY

BACKGROUND OF THE INVENTION

1. Technical Field of the Invention

The present invention relates to an integrated sealed secondary battery wherein a plurality of cells are arranged in a row, thereby forming a one-piece battery housing.

2. Description of Related Art

FIG. 16 shows a known integrated sealed secondary battery of this type disclosed in Laid-open Japanese Patent Publication No. 7-85847. Electricity-generating elements are accommodated respectively in cases 63 formed in rectangular tubular shape having a bottom, and the apertures of the cases 63 are sealed by covers 64, thereby constituting cells 62. A plurality of these cells 2 are arranged in a row, and the cases 63 of these cells 62 are tightly bound together with end plates 65 and restraining bands 66. Positive electrode terminals 67 and negative electrode terminals 68 of cells 62 pass through the covers 64, projecting upwardly, and these terminals 67, 68 are connected successively in series by electrical connection bars 69.

The mono-block rechargeable battery disclosed in Laid-open Japanese Patent Publication No. 6-215804 in which a battery housing and a cover made of plastics material are heat-welded is constructed as follows. Side plates having concave spaces on the inside thereof are heat-welded to the outside faces of opposite side walls of two battery housings, whereby a cooling jacket is formed between the side walls of the battery housings and the side plates. A cooling liquid inlet orifice and outlet orifice are provided at the top of the two ends of the side plates. Within the cooling liquid jacket, flow-alignment projecting strips are provided alternately from the top surface and bottom surface of the interior of the cooling jacket for forming a meandering flow passage, and, furthermore, air escape apertures of about 1 to 3 mm are formed between the top face and the tops of the flow-alignment projecting strips that extend downwards from the top face.

Laid-open Japanese Patent Publication No. 61-45571 discloses the provision of cooling passages that pass through upper and lower portions of partitions between cells in a mono-block housing, and the provision of cooling medium inlet/evacuation headers thereabove and therebelow, separate covers being provided for each cell.

However, with the integrated sealed secondary battery of Laid-open Japanese Patent Publication No. 7-85847, since the cells are tightly bound in close contact, if the ambient temperature is high or if discharge is effected with large current, heat cannot be removed sufficiently from the cells. There is therefore the problem that the temperature of the cells rises, lowering cell life.

In this regard, in the rechargeable battery of Laid-open Japanese Patent Publication No. 6-215804, temperature rise can be suppressed to some extent since both side faces of the battery housing are cooled by the cooling jacket. Also, the meandering flow passage formed within the cooling jacket enables uniform cooling of the entire surface of the side walls of the battery housing. Furthermore, since air escape apertures are formed in the corners where the top wall of the cooling jacket and the flow-alignment projecting strips are connected, the loss of cooling performance produced by stagnation of air taking place in these corners can be suppressed to some extent. Nevertheless, in the case of a secondary battery in which cells are integrated as shown in FIG. 16, the temperature rise of the cells cannot be sufficiently suppressed, because of insufficient cooling between the cells.

In order to solve the problem of the integrated sealed secondary battery of Laid-open Japanese Patent Publication No. 7-85847 referred to above, the inventors of the present application have performed various studies, in which spaces were provided between the cells so as to form cooling passages and this was combined with the cooling jacket as disclosed in Laid-open Japanese Patent Publication No. 6-215804. The results shows that the cooling medium tends to stagnate particularly in the corners of the flow-alignment projecting strips and the top wall of the cooling jacket, which was found to be the main cause of drop in cooling performance. It was further ascertained that small air escape apertures provided at the corners of the flow-alignment projecting strips had little effect of causing cooling medium to flow smoothly and air to be discharged.

In the case of the rechargeable battery of Laid-open Japanese Patent Publication No. 61-45571, while the region where the cooling passages are formed that pass through upper and lower portions of partitions between the cells in the mono-block housing is forcibly cooled, the cooling effect is still insufficient, since the entire outside surface of the cells is not forcibly cooled. There are also the problems that, since the construction of the housing is complicated, manufacturing costs are high and, since it is necessary to provide a cover for each cell, a large number of separate operational steps are required in assembly, also raising the cost.

SUMMARY OF THE INVENTION

In view of the above problems, an object of the present invention is to provide an integrated sealed secondary battery which is of an inexpensive construction and wherein the cells can be effectively cooled.

Another object of the present invention is to enhance cooling effect of each of the cells by causing cooling medium to flow efficiently in cooling medium passages provided between the cells. Yet another object of the present invention is to prevent drop in the cooling effect by preventing air stagnation in the cooling medium passages.

The present invention provides an integrated sealed secondary battery comprising: a plurality of cells arranged in a row respectively accommodating electricity-generating elements within rectangular tubular cases having a bottom, with their upper open ends being sealed; first cooling medium passages formed on both sides of the row of the cells; second cooling medium passages formed between the cases of the cells that communicate with the first cooling medium passages on both sides of the row of the cells; and means for generating pressure difference at both ends of the second cooling medium passages between the cases.

With this construction, all of the side faces of the cells, including those between the cells, can be forcibly cooled by the cooling medium passing through the cooling medium passages between the cases and the cooling medium passages on both sides. While cooling medium tends to flow out smoothly when it is made to flow through the cooling medium passages on both sides, it tends to stagnate in the cooling medium passages between the cases that are branched from the cooling medium passages on both sides. However, thanks to the provision of means for generating a pressure difference at both ends of the cooling medium passages between the cases, it can be made to flow reliably through the cooling medium passages between the cases. Consequently, all of the cells can be effectively cooled.

Means for generating a pressure difference at both ends of the cooling medium passages between the cases may be constructed in various manners as will be described in detail later. For example, the flow path cross-sectional areas of the cooling medium passages on both sides may be mutually differed. Such is a comparatively straightforward arrangement and does not involve large pressure loss, whereby pressure difference can be created such as to cause suitable flow of the cooling medium through the cooling medium passages between the cases.

The present invention also provides an integrated sealed secondary battery comprising: a plurality of cells arranged in a row respectively accommodating electricity-generating elements within rectangular tubular cases having a bottom with their upper open ends being sealed; first cooling medium passages formed on both sides of the row of the cells; second cooling medium passages formed between the cases of the cells that communicate with the first cooling medium passages on both sides of the row of the cells; projection strips provided in the first cooling medium passages such as to alternately extend downwards from a top wall and upwards from a bottom wall of the first cooling medium passages so that the first cooling medium passages meander upwards and downwards; and air escape apertures formed between the top wall of the cooling medium passages and top ends of the projection strips that extend downwards from the top wall of the cooling medium passages.

Even when air stagnates in the corners between the tops of the flow-alignment projecting strips and the top wall of the cooling medium passage, this air is moved through the air escape apertures towards the downstream side, until it is finally discharged from the cooling medium passage. Loss of cooling performance due to the occurrence of air stagnation in the meandering passage can be thus reliably prevented.

Inclined faces may be formed that are inclined towards their sides in at least portions facing the air escape apertures of the top walls of the cooling medium passages. Thereby, even if air stagnates in these corners, it can be shifted towards the middle of the meandering flow passage by the inclined faces, through the air escape apertures. Stagnant air is entrained by the strong current of cooling medium flowing through the meandering flow passage, shifting it downstream, so the lowering of cooling performance caused by stagnation of air in the meandering flow passage can be even more reliably prevented.

Alternatively, inclined faces may be formed that are inclined upwards towards the outlet from the inlet of the cooling medium passages in the top walls of the cooling medium passages. Thereby, the air passes successively through the air escape apertures along these inclined faces as far as the outlet of the cooling medium passages, where it is smoothly discharged.

The height positions of the tops of the flow-alignment strips may be made practically the same, and the aperture area of the escape apertures may be made progressively larger from the inlet end towards the outlet end of the cooling medium passages. Thereby, it becomes progressively easier for the air to flow out, as it proceeds towards downstream, making it possible for the air to be evacuated even more smoothly.

Alternatively, the air can be evacuated smoothly by forming inclined faces which are inclined upwards towards both sides from the portion opposite the air escape apertures in the top walls of the cooling medium passages.

The angle of inclination of the inclined faces with respect to the horizontal plane should preferably be 3 to 5°, and the vertical width of the air escape apertures should preferably be 3 to 5 mm, so that air stagnating in the corners between the top ends of the flow-alignment projecting strips and the top walls of the cooling medium passages can be reliably shifted towards the middle of the meandering flow passage, making it possible to reliably prevent lowering of cooling performance caused by stagnation of the air.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 12 is a diagrammatic horizontal cross-sectional plan view showing an example of a sixth and seventh construction of means for generating a pressure difference at both ends of cooling passages between the cases in this embodiment;

PREFERRED EMBODIMENTS OF THE INVENTION

Preferred embodiments of an integrated sealed secondary battery according to the present invention will be described below with reference to the accompanying drawings.

Figure 1:
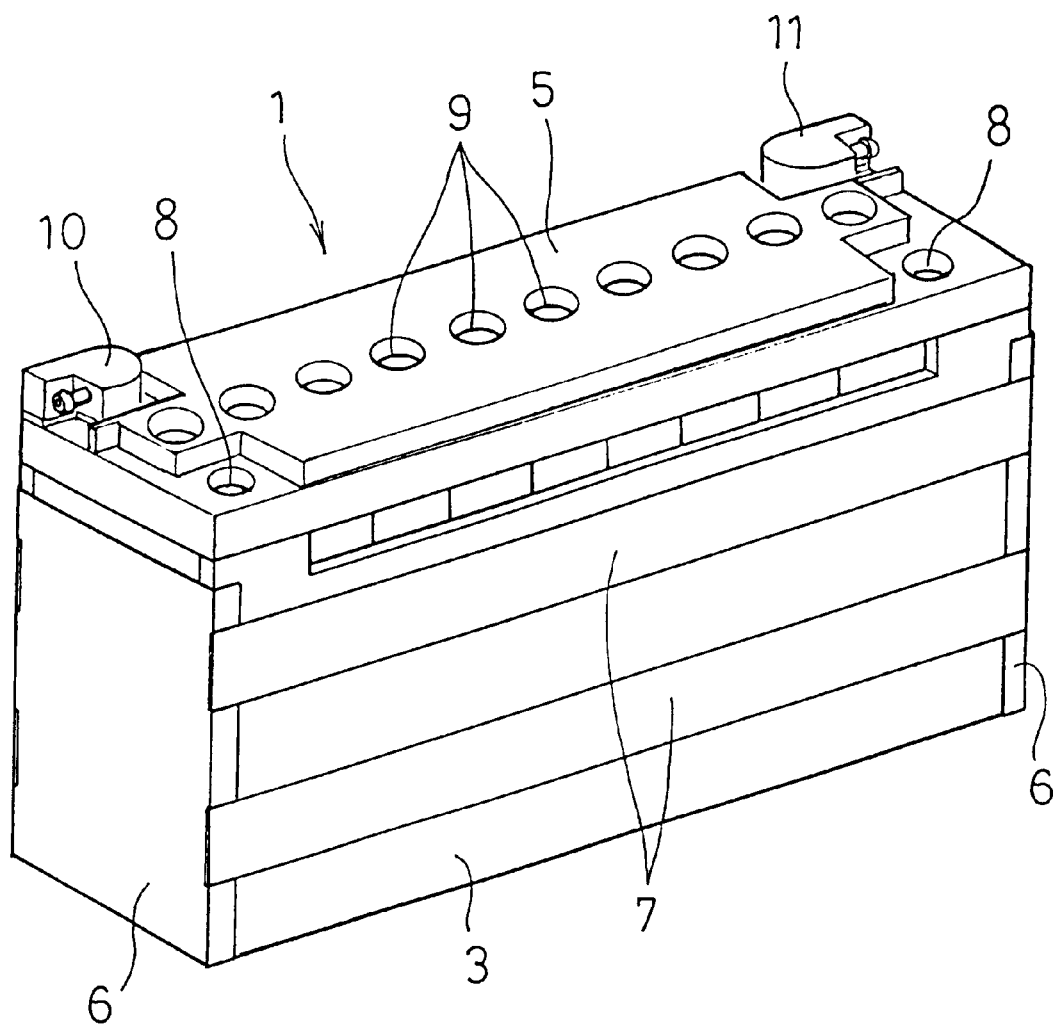
FIG. 1 is an external perspective view of one embodiment of an integrated sealed secondary battery according to the present invention.
Figure 2:
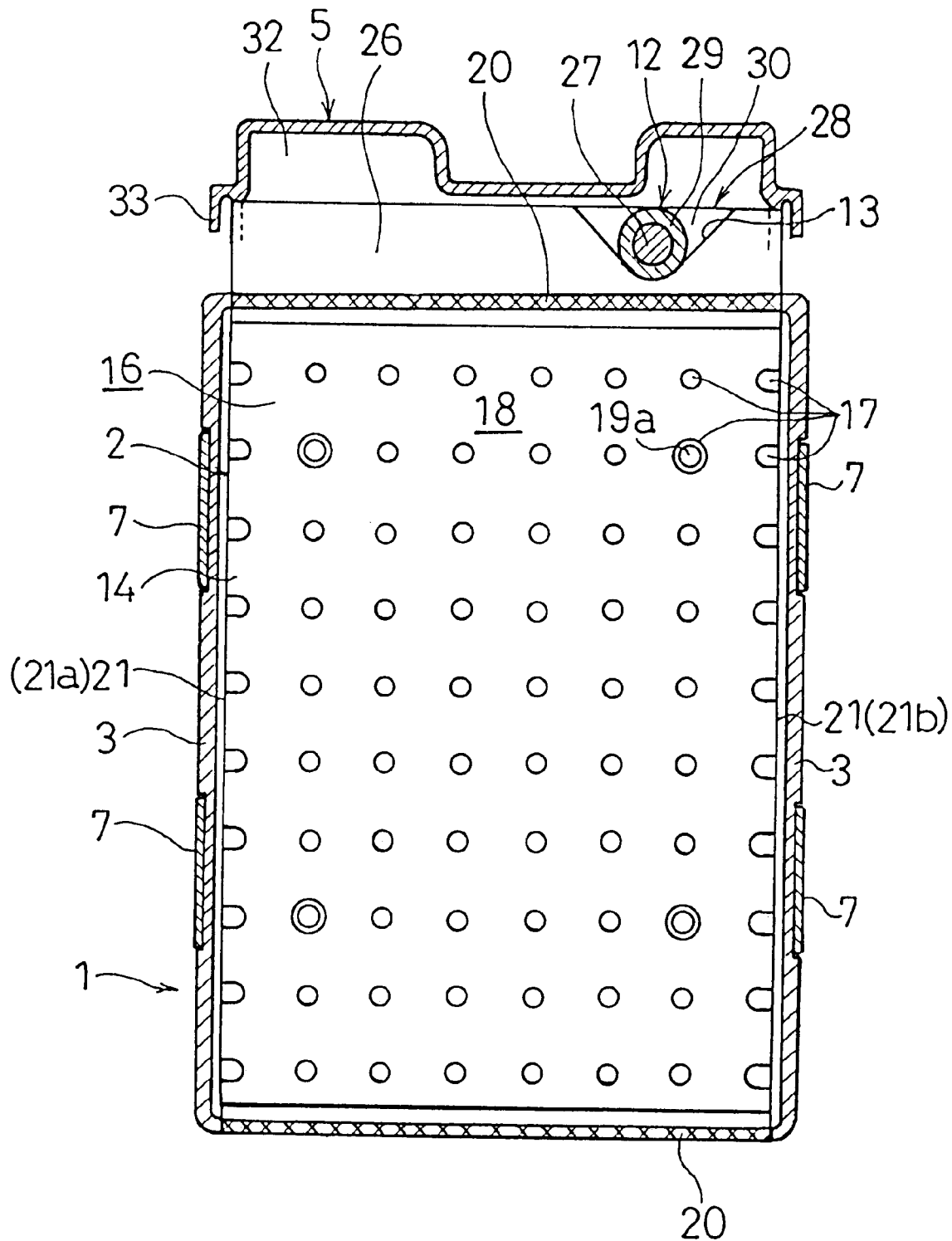
FIG. 2 is a vertical cross-sectional view of this embodiment.
Figure 3:
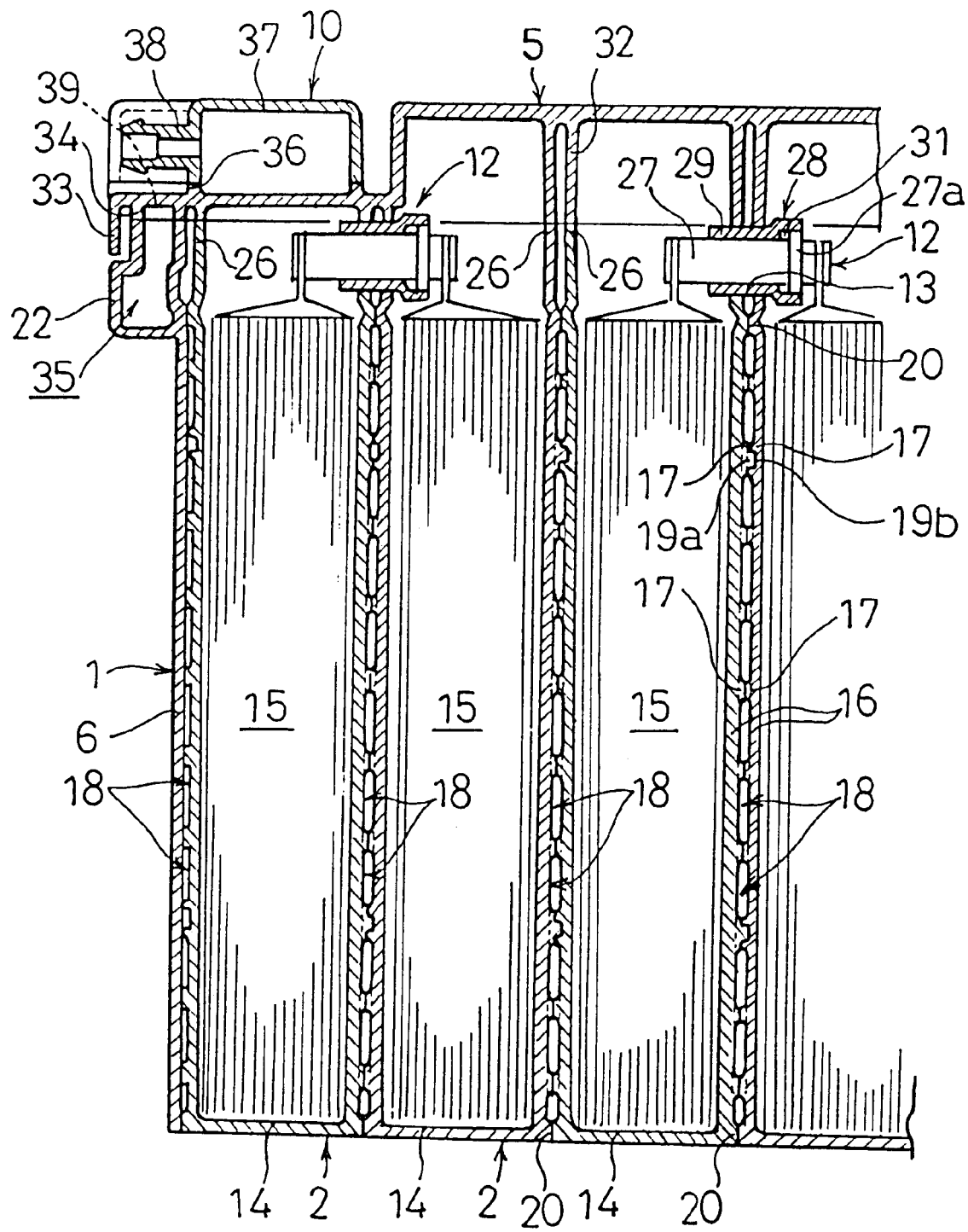
FIG. 3 is a partial vertically sectioned front view of this embodiment.

The integrated sealed secondary battery 1 according to this embodiment is a nickel/hydrogen secondary battery suitable for use as a drive power source for an electric automobile. As shown in FIG. 1 to FIG. 3, the integrated sealed secondary battery 1 comprises a one-piece battery housing obtained by mutually joining a plurality of individual cells 2 that are connected in series and arranged in a row. End plates 6 are joined at both ends of the row of cells, and a plate-shaped cooling jacket member 3 with inwardly concave spaces are joined to both sides of the cells 2 and end plates 6. Further, an integrated cover 5 is joined on the top of the cells 2 and end plates 6 for closing these in a sealed condition. The cells 2 between the end plates 6, 6 are tightly bound together by restraining bands 7. Numeral 8 represents terminal mounting holes formed in the cover 5 to permit the positive electrode terminals and/or negative electrode terminals projecting in the upwards direction from cells 2 at one end and at the other end to pass therethrough. Numeral 9 represents safety valve mounting holes formed in the cover 5 corresponding to each cell 2. Numerals 10 and 11 respectively represent an inlet orifice and outlet orifice for a cooling medium, these being integrally mounted at both ends of the cover 5. Cells 2, cooling jacket member 3, cover 5, end plates 6, inlet orifice 10, and outlet orifice 11 are constituted of synthetic resin such as PP/PPE alloy, and are integrally joined to each other by welding. Adjacent cells 2,2 are electrically connected by connectors 12 as shown in FIG. 2 and FIG. 3.

Referring to FIG. 2 and FIG. 3, cells 2 are constituted by electricity-generating elements 15 accommodated within cases 14 of rectangular tubular shape having a bottom. A large number of bosses 17 are projected in matrix fashion on opposite wall faces 16 of mutually opposite cases 14 of the cells 2 such as to contact with each other in the condition in which cells 2 are arranged adjacent to each other in a row. The spaces formed between opposite wall faces 16, 16 by these bosses 17 constitute cooling medium passages 18 between the cases. It should be noted that end plates 6 are in contact with and joined to opposite wall faces 16 on the outside of the two end cells 2 of the row of cells, so that in this embodiment a cooling medium passage 18 is also formed between these end plates 6 and the opposite wall face 16 of two end cells. A plurality of bosses 17 in suitable locations (in the example illustrated, four locations) are formed of larger diameter, their end faces being formed with engagement projections 19a and engagement recesses 19b for mutual sliding engagement, which are employed for mutual positional location of the cases 14. Also, joining edges 20 project to effect mutual contact at the bottom edge and at a position a suitable distance below the upper end of the case 14. Thus, cells 2 can be integrally joined in the form of a one-piece battery housing by mutual welding of bosses 17 and joining edges 20 that are in mutual contact in a condition where cells 2 are arranged adjacent to each other in a row.

Cooling medium passages 21 are constituted on both sides with respect to the direction of arrangement of these cells 2 by the spaces formed between the inside faces of the cooling jacket member 3 and cells 2. Further, troughs 22 that form distribution headers and communicate with the cooling medium passages 21 on both sides for distributing cooling medium (water) are formed at the upper edges of the end plates 6.

Figure 4:
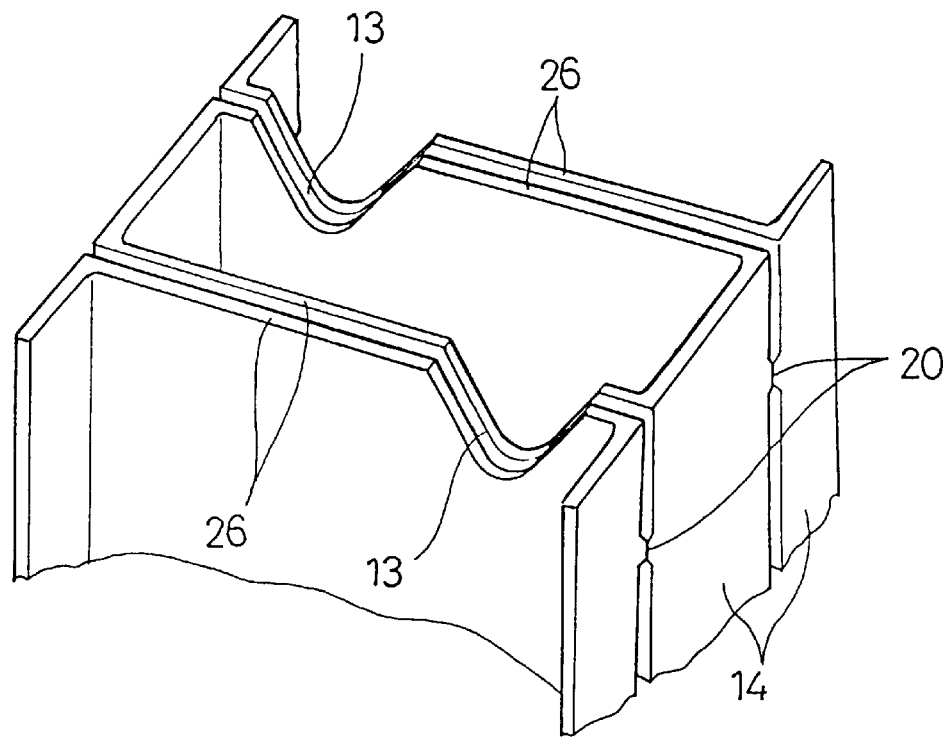
FIG. 4 is a partial perspective view of the upper end part of a group of cells in this embodiment.

As shown in FIG. 2, FIG. 3 and FIG. 4, in an upper frame 26 above the upper joining edges 20 in the cases 14 of cells 2 which are to constitute the integral battery housing, there are formed practically triangular-shaped notches 13 in zig-zag fashion for arranging connectors 12 to effect electrical connection of adjacent cells 2. The connectors 12 fitted in the notches 13 are integrally joined to the cases 14 and to the cover 5 in a sealed condition.

Figure 5:
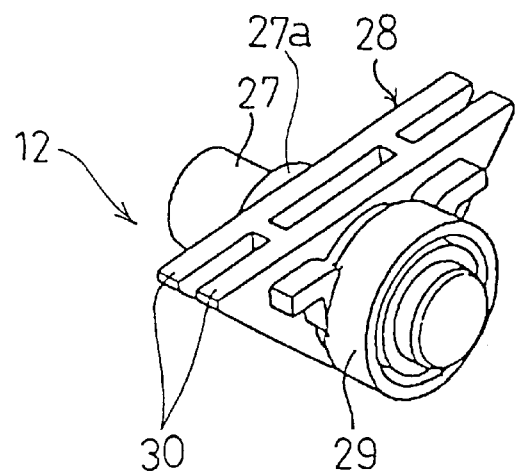
FIG. 5 is a perspective view of an electrical connection element of this embodiment.

As shown in FIG. 2, FIG. 3 and FIG. 5, the connector 12 comprises a connecting shaft 27 made of metal (such as nickel) and a support element 28 made of synthetic resin. The connecting shaft 27 is inserted into a holding tube 29 of the support element 28 in a pressed-in condition, perfect sealing being effected by an O-ring 31 that is inserted between a flange 27a of the connecting shaft 27 and the inner circumference of the holding tube 29. A pair of triangular-shaped lugs 30 project t from the holding tube 29 of the support element 28. These lugs 30 are respectively joined to the upper frame 26 when the connector 12 is arranged in the notch 13.

As shown in FIG. 2 and FIG. 3, the cover 5 is formed on its inside surface with individual frames 32 so as to correspond with the upper frames 26 of the cases 14. Also, at the outer circumference, the re is provided a downwardly directed outer circumferential frame 33 of inverted L-shaped cross section. At both ends in the longitudinal direction n of the cover 5, there are provided sealing projections 34 that are joined to the upper end of the troughs 22 for forming sealed distribution headers 35.

Figure 6:
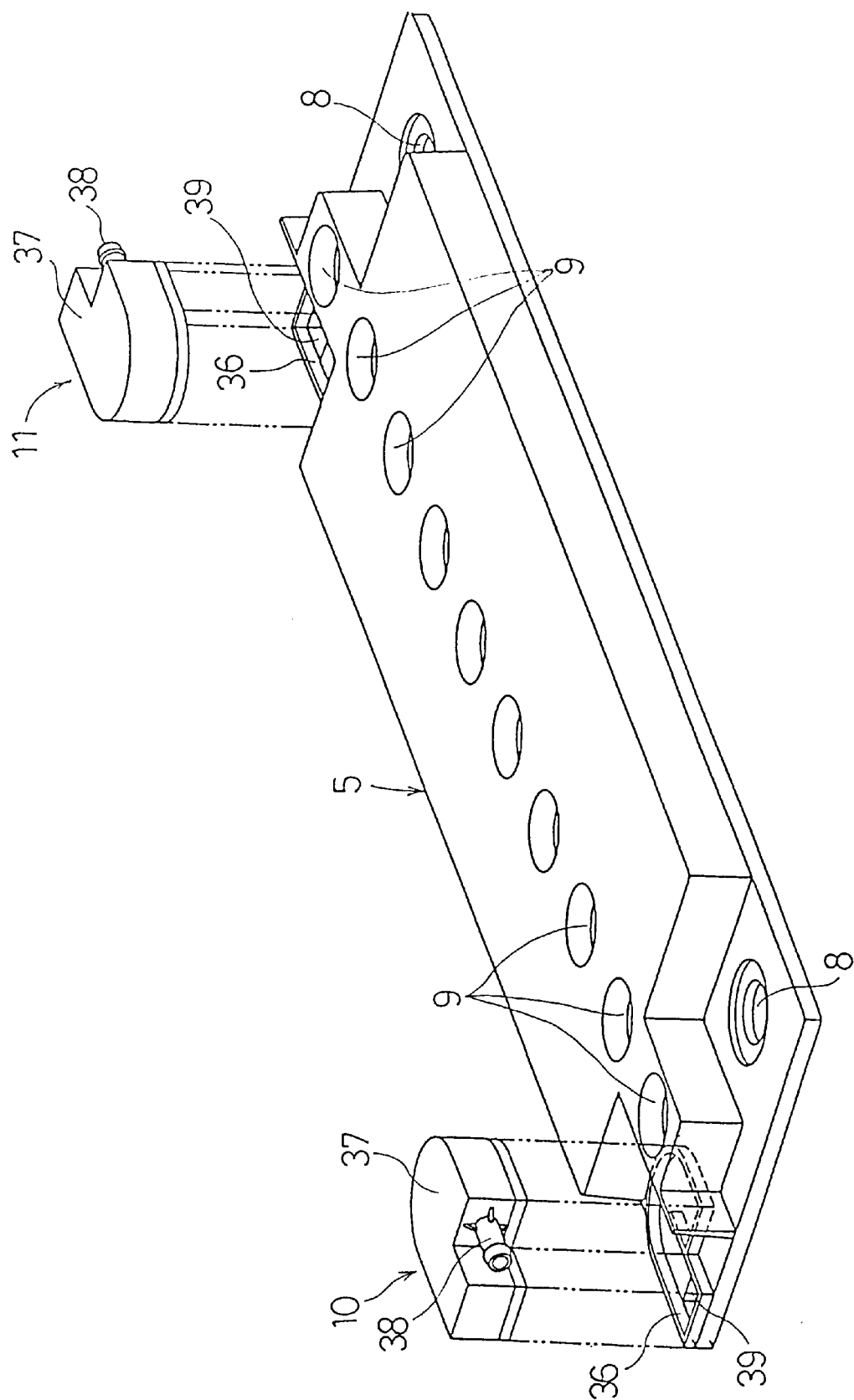
FIG. 6 is a perspective view of a cover of this embodiment.

As shown in FIG. 6, on one side of the two ends of the cover 5, there is formed a terminal mounting hole 8, while on the other side there is provided joining projections 36 for joining the inlet orifice 10 and outlet orifice 11. These orifices 10, 11 are respectively comprised of J-shaped box elements 37 whose planar surface is approximately J shaped and whose underside is open. Connecting ports 38 are provided to the tip of the short side of these J-shaped box elements 37. In a portion of the cover 5 opposite the tip of the long side of J-shaped box element 37, communicating apertures 39 that communicate with the distribution headers 35 are formed.

Figure 7:
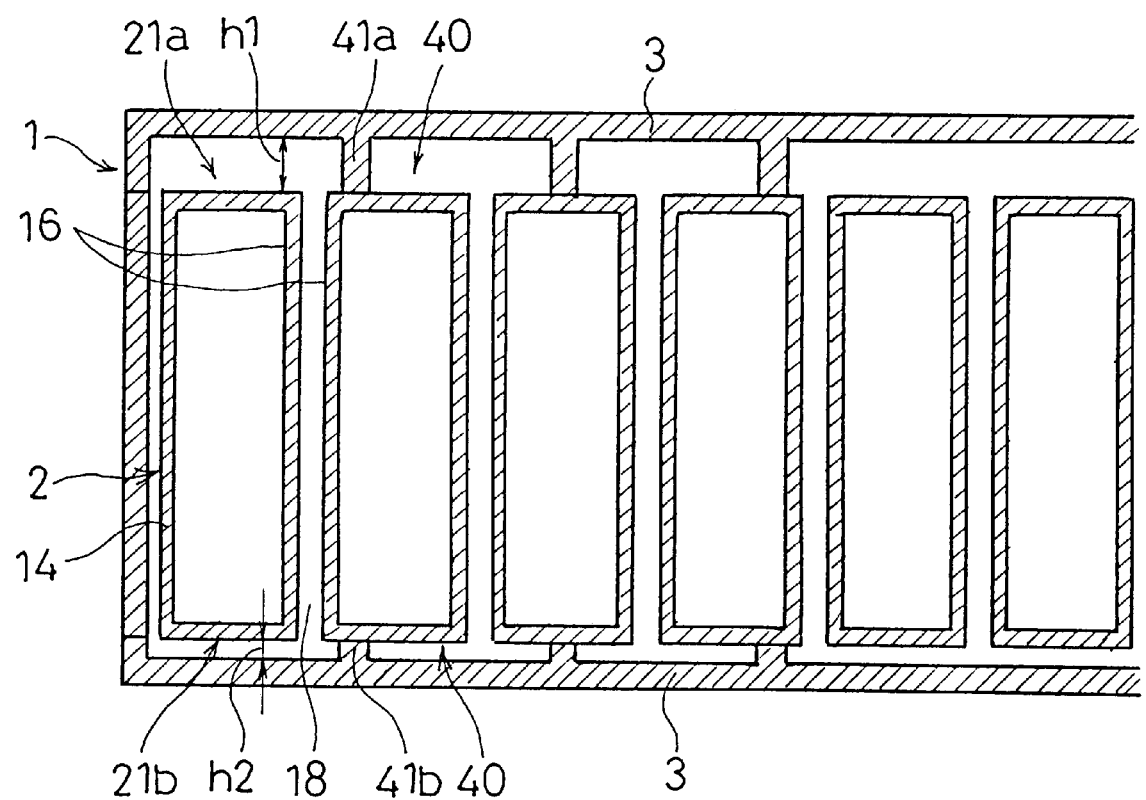
FIG. 7 is a diagrammatic horizontal cross-sectional plan view showing an example of a first construction of means for generating a pressure difference at both ends of cooling passages between the cases in this embodiment.

Referring to FIG. 7, on the inside face of cooling jacket member 3, flow-alignment projecting strips 41 are provided so as to form a meandering flow passage 40 (see FIG. 14) that meanders upwards and downwards so as to achieve uniform flow of the cooling medium over the entire surface of the cooling medium passages 21 on both sides. Furthermore, the flow path cross-sectional area of the cooling medium passage 21a on one side is made larger than the flow path cross-sectional area of the cooling medium passage 21b on the other side, by making the height h1 of the flow-alignment projecting strips 41a in the cooling medium passage 21a on one side higher than the height h2 of the flow-alignment projecting strips 41b in the cooling medium passage 21b on the other side.

It should be noted that the flow-alignment projecting strips 41 can be provided on the side of the cases 14 of the cells 2 instead of on the cooling jacket member 3, and they need not necessarily be constituted to form a flow passage that meanders upwards and downwards. Furthermore, a construction could be employed in which no flow-alignment projecting strips 41 are provided.

In the integrated sealed secondary battery 1 constructed as above, when the cooling medium is supplied from the inlet orifice 10, it flows into the cooling medium passages 21a, 21b on both sides through the distribution header 35, and while flowing towards the downstream side through these cooling medium passages 21a, 21b, it also flows between these two cooling medium passages through the cooling medium passages 18 between the cells 2, before it is discharged from the outlet orifice 11.

In this process, since the flow path cross-sectional areas of the cooling medium passages 21a and 21b on both sides are made different from each other, pressure is created within the two cooling medium passages 21a, 21b, producing a pressure difference at the two ends of the cooling medium passages 18 between the cases. The cooling medium therefore flows reliably through the cooling medium passages 18 between the cases, which are branched from cooling medium passages 21a, 21b, without any possibility of stagnation. Consequently, all of the side faces of the cases 14 of cells 2, including opposite wall faces 16, are forcibly cooled by the cooling medium, and thus all of the cells 2 are effectively cooled. This construction can not only be constructed simply by making the heights of the flow-alignment projecting strips 41a, 41b different, but also involves no large pressure loss in making the cooling medium to flow through a large number of cooling medium passages 18 between the cells 2.

Also, in this embodiment, the inlet orifice 10 and outlet orifice 11 that supply and evacuate the cooling medium with respect to the cooling medium passages 21a, 21b are provided at both ends in the direction of arrangement of the cells, and are connected to the cooling medium passages 21a, 21b through the distribution headers 35. Consequently, when a plurality of secondary batteries 1 are connected to each other, the entire periphery of all of the cells 2 can be effectively cooled by a single cooling medium path.

Furthermore, since the one-piece battery housing is constituted by integrally connecting the individual cells 2 by welding with their apertures being sealed by the integral cover 5 welded thereonto, the integrated sealed secondary battery 1 encased in a one-piece housing can be obtained with a small number of components and assembly steps. Also, the cooling medium passages 18 between the cases are formed by mutual contact and welding of the bosses 17 formed on opposite wall faces 16 of the cases 14 of each of the cells 2. Consequently, cooling medium passages 18 between the cases can be formed over the entire surface of the opposing wall faces 16,16 in a simple and inexpensive manner.

Moreover, a lightweight construction can be achieved, since the cooling medium passages 21 on both sides are constituted by joining compact plate-shaped cooling jacket members 3 on both sides of the row of cells.

In the above description, an example was illustrated in which, as means for generating a pressure difference between the two ends thereof, the flow path cross-sectional areas of the cooling medium passages 21a and 21b on both sides were made different. However, various other means for making the cooling medium to flow reliably through the cooling medium passages 18 between the cases can be employed, as will be hereinafter described with reference to FIG. 8 to FIG. 12.

Figure 8:
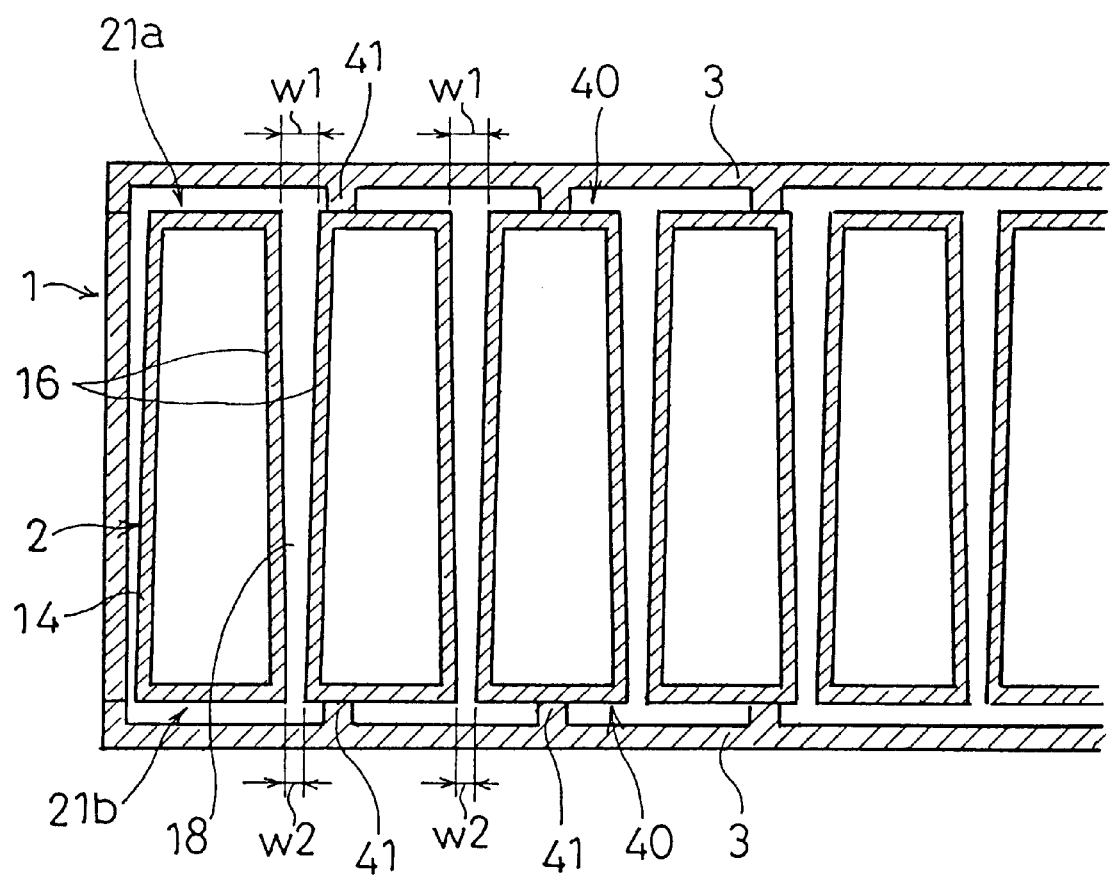
FIG. 8 is a diagrammatic horizontal cross-sectional plan view showing an example of a second construction of means for generating a pressure difference at both ends of cooling passages between the cases in this embodiment.

For example, as shown in FIG. 8, the cooling medium passages 18 between the cases can be tapered from one side to the other side, by making the width w2 on the other side of the cooling medium passages 18 between the cases smaller than the width w1 on one side. In this case, the pressure at one side of the cooling medium passages 18 between the cases becomes higher than that at the other side, causing the cooling medium to flow from one side to the other side smoothly.

Figure 9:
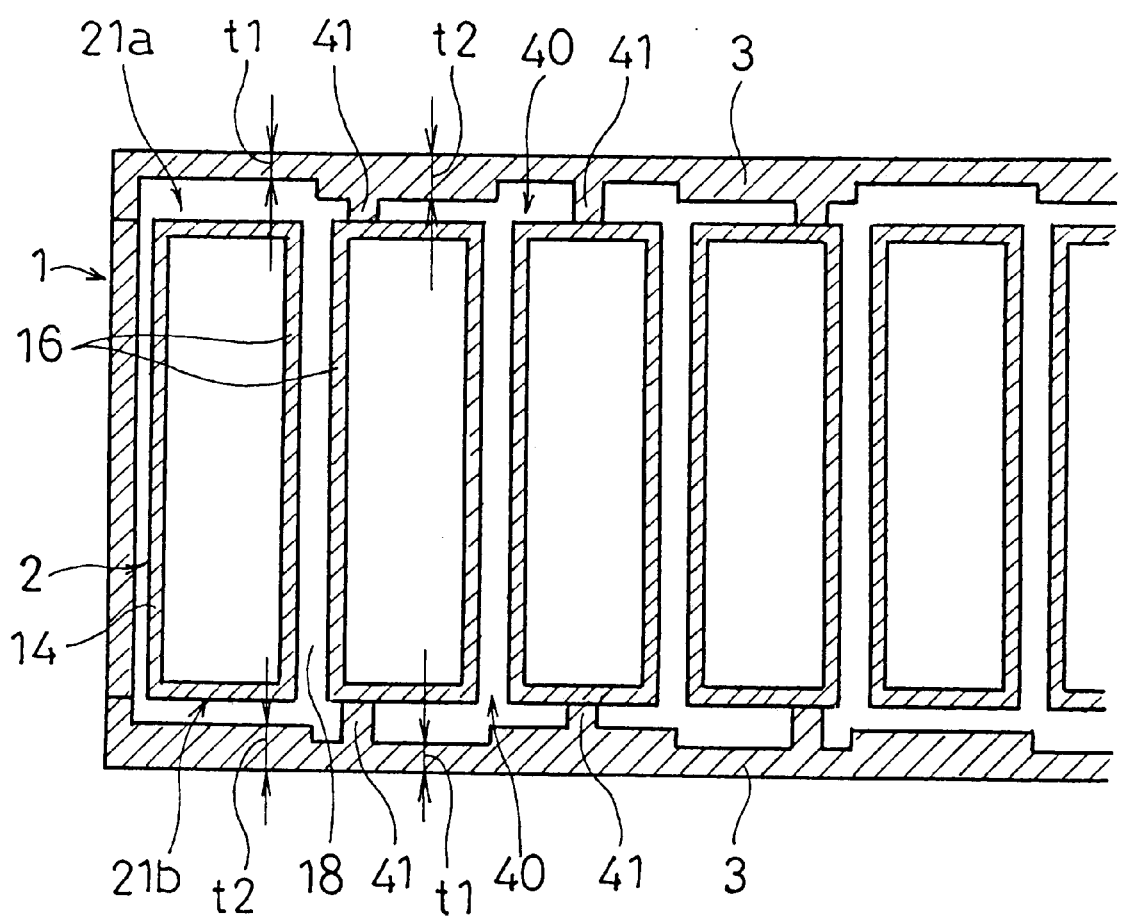
FIG. 9 is a diagrammatic horizontal cross-sectional plan view showing an example of a third construction of means for generating a pressure difference at both ends of cooling passages between the cases in this embodiment.

Also, as shown in FIG. 9, the cross-sectional areas of the cooling medium passages 21a, 21b on both sides can be made mutually and alternately different by making the mutually opposite wall surface thicknesses in the meandering passages 40 in the cooling medium passages 21a, 21b on both sides different, as t1, t2. In this case also, the pressure becomes higher where the flow path cross-sectional area of the cooling medium passages 21a, 21b on both sides is larger, with the result that cooling medium flows through the cooling medium passages 18 from higher pressure to lower pressure.

Figure 10:
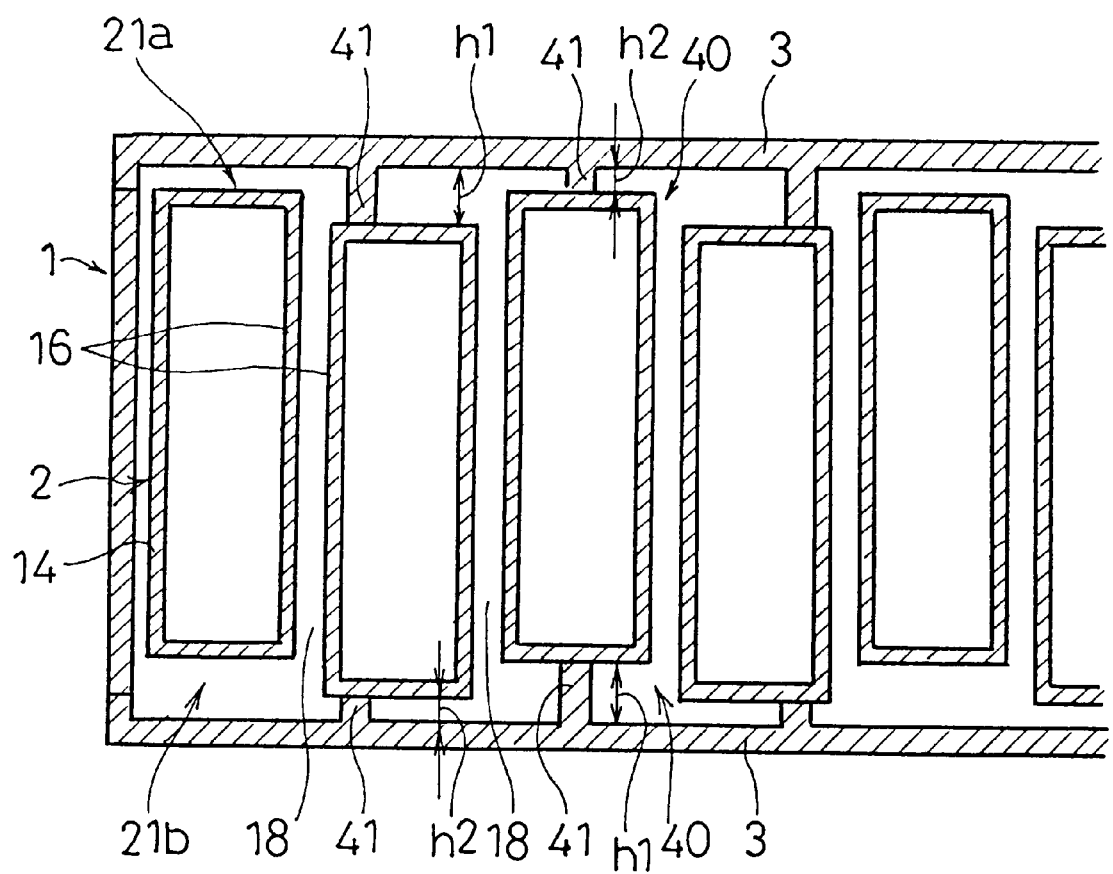
FIG. 10 is a diagrammatic horizontal cross-sectional plan view showing an example of a fourth construction of means for generating a pressure difference at both ends of cooling passages between the cases in this embodiment.

Also, as shown in FIG. 10, the cross-sectional areas of the cooling medium passages 21a, 21b on both sides forming the meandering passages 40 can be made mutually and alternately different by making the heights of the flow-alignment projecting strips 41 that form the meandering passages 40 in the cooling medium passages 21a, 21b on both sides mutually and alternately different, as h1, h2. In this case also, the pressure becomes higher where the flow path cross-sectional area of the cooling medium passages 21a, 21b on both sides is larger, with the result that cooling medium flows through the cooling medium passages 18 from higher pressure to lower pressure.

Figure 11:
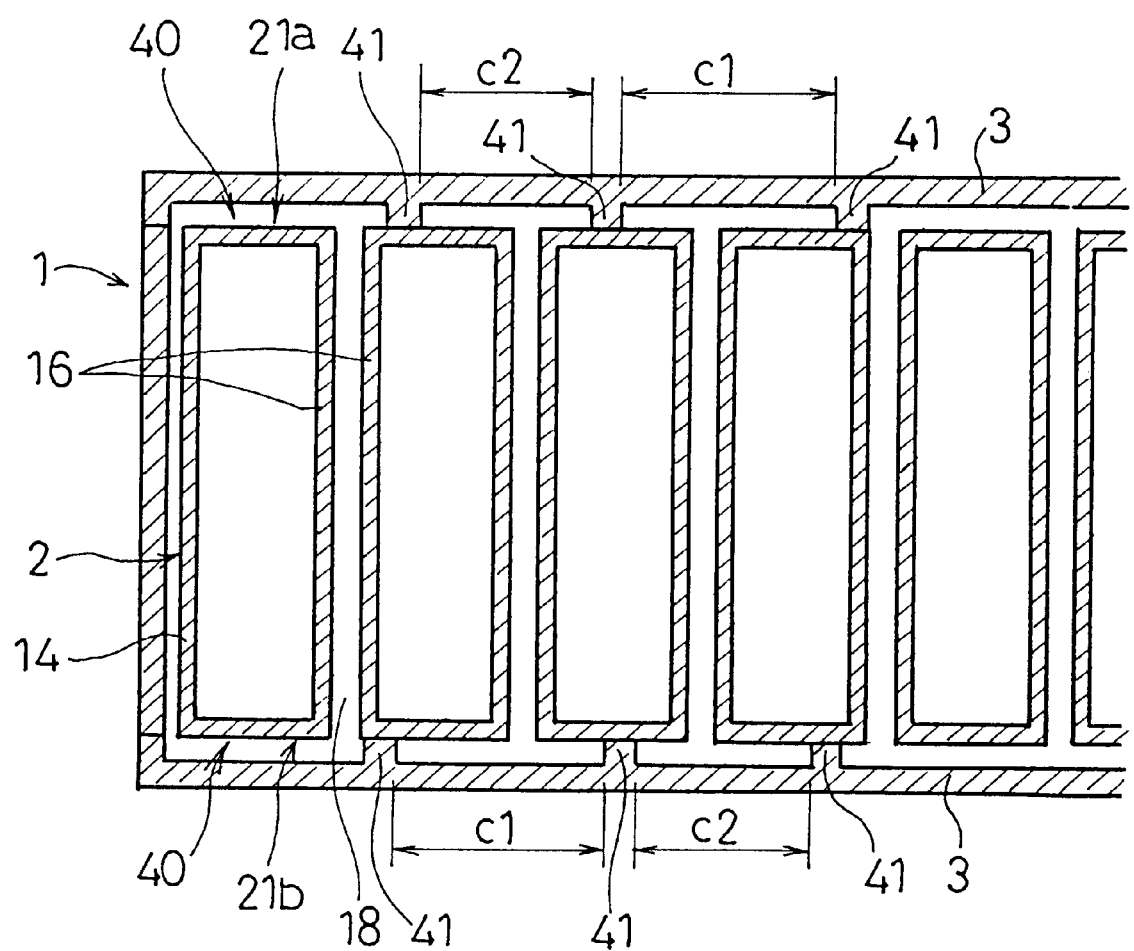
FIG. 11 is a diagrammatic horizontal cross-sectional plan view showing an example of a fifth construction of means for generating a pressure difference at both ends of cooling passages between the cases in this embodiment.

Also, as shown in FIG. 11, the cross-sectional areas of the cooling medium passages 21a, 21b on both sides forming the meandering passages 40 can be made mutually and alternately different by making the distances between the flow-alignment projecting strips 41, 41 that form the meandering passages 40 in the cooling medium passages 21a, 21b on both sides mutually and alternately different, as c1, c2. In this case also, the pressure becomes higher where the flow path cross-sectional area of the cooling medium passages 21a, 21b on both sides is larger, with the result that cooling medium flows through the cooling medium passages 18 from higher pressure to lower pressure.

Also, as shown in FIG. 12A, in the distribution header 35 on the side of the inlet orifice 10, the cross-sectional areas s1 and s2 of flow path restriction sections 44a, 44b for communicating the distribution header 35 with both of the cooling medium passages 21a, 21b may be made different from each other. Alternatively, as shown in FIG. 12B, the distances d1 and d2 between the inlet orifice 10 and the communicating sections 45a, 45b connecting with the cooling medium passages 21a, 21b on both sides may be made different. In this case also, the pressure in the cooling medium passages 21a, 21b is made different and the cooling medium passes through the cooling medium passages 18 between the cases from one cooling medium passage which is at higher pressure towards the other cooling medium passage which is at lower pressure.

It should be noted that, the same construction as that of FIGS. 12A, 12B may be provided to the distribution header 35 on the side of the outlet orifice 11 where the cooling medium is collected from the cooling medium passages 21a and 21b. Similarly, the flow path restriction sections 44a, 44b may be provided to the distribution header 35 at both ends, or the positions or arrangement of the inlet and outlet orifices 10, 11 may be varied.

Figure 13:
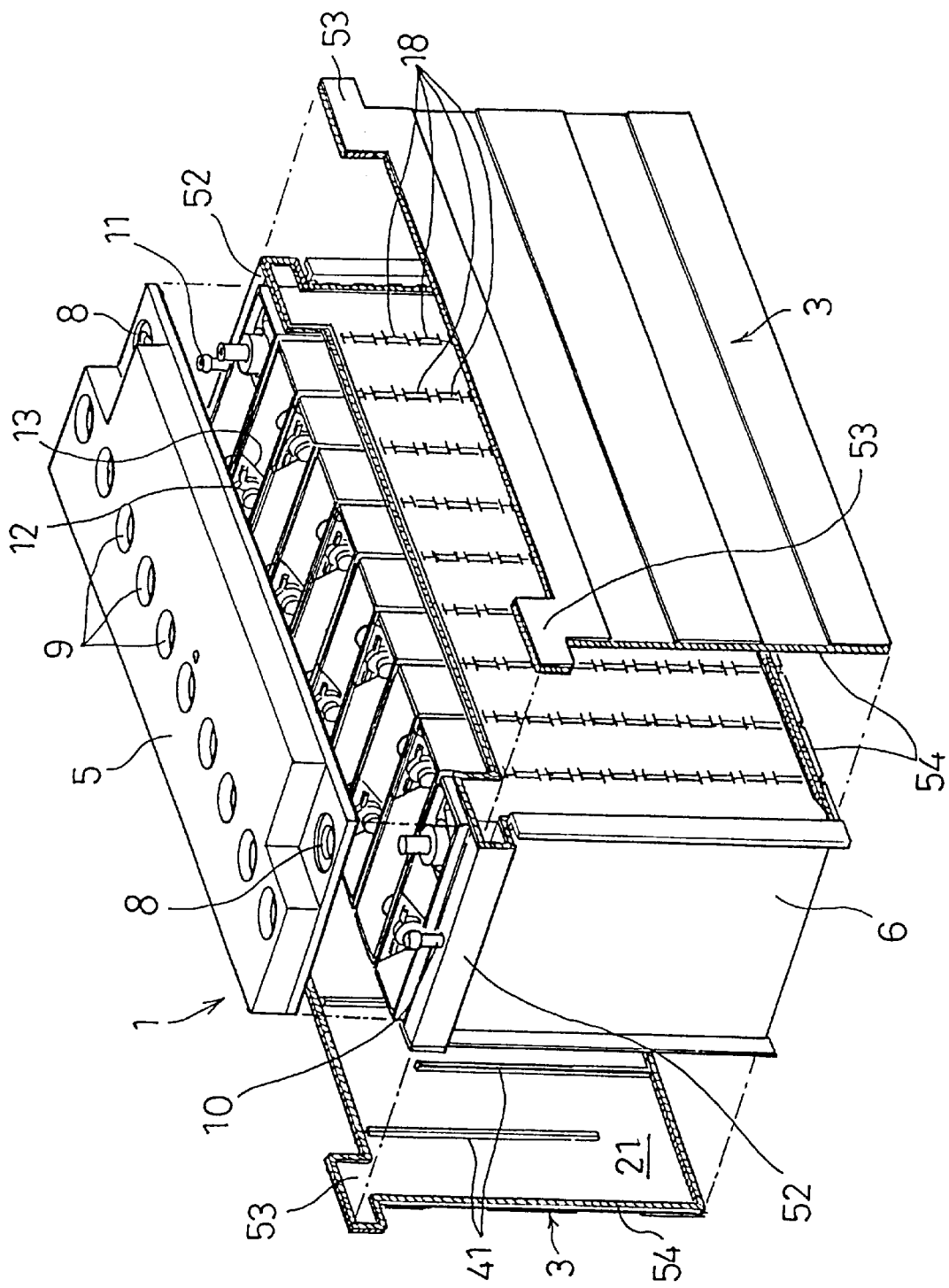
FIG. 13 is an exploded perspective view of another embodiment of an integrated sealed secondary battery according to the present invention.

In the above embodiment, an example was illustrated in which the end plates 6 are covered with the cover 5, with the inlet orifice 10 and outlet orifice 11 being provided in the cover 5. However, as shown in FIG. 13, the cover 5 may be constructed so as to cover only the group of cells 2, distribution headers 52 being integrally provided at the tops of end plates 6 at both ends, with the inlet orifice 10 or the outlet orifice 11 projecting at the upper surface thereof, and a connection portion 53 for connecting the cooling medium passages 21 with the distribution headers 52 at both ends being formed at the upper edge of both ends of the cooling jacket member 3. The portions indicated by the shading in FIG. 13 are the welds 54 of the integrated unit constituted by cells 2 and the cooling jacket members 3.

With this embodiment, essentially the same beneficial actions as in the embodiment described above are obtained. Also, although, in the embodiments described above, examples were illustrated in which the various constructional members were joined by welding, joining could be effected using adhesive.

Figure 14:
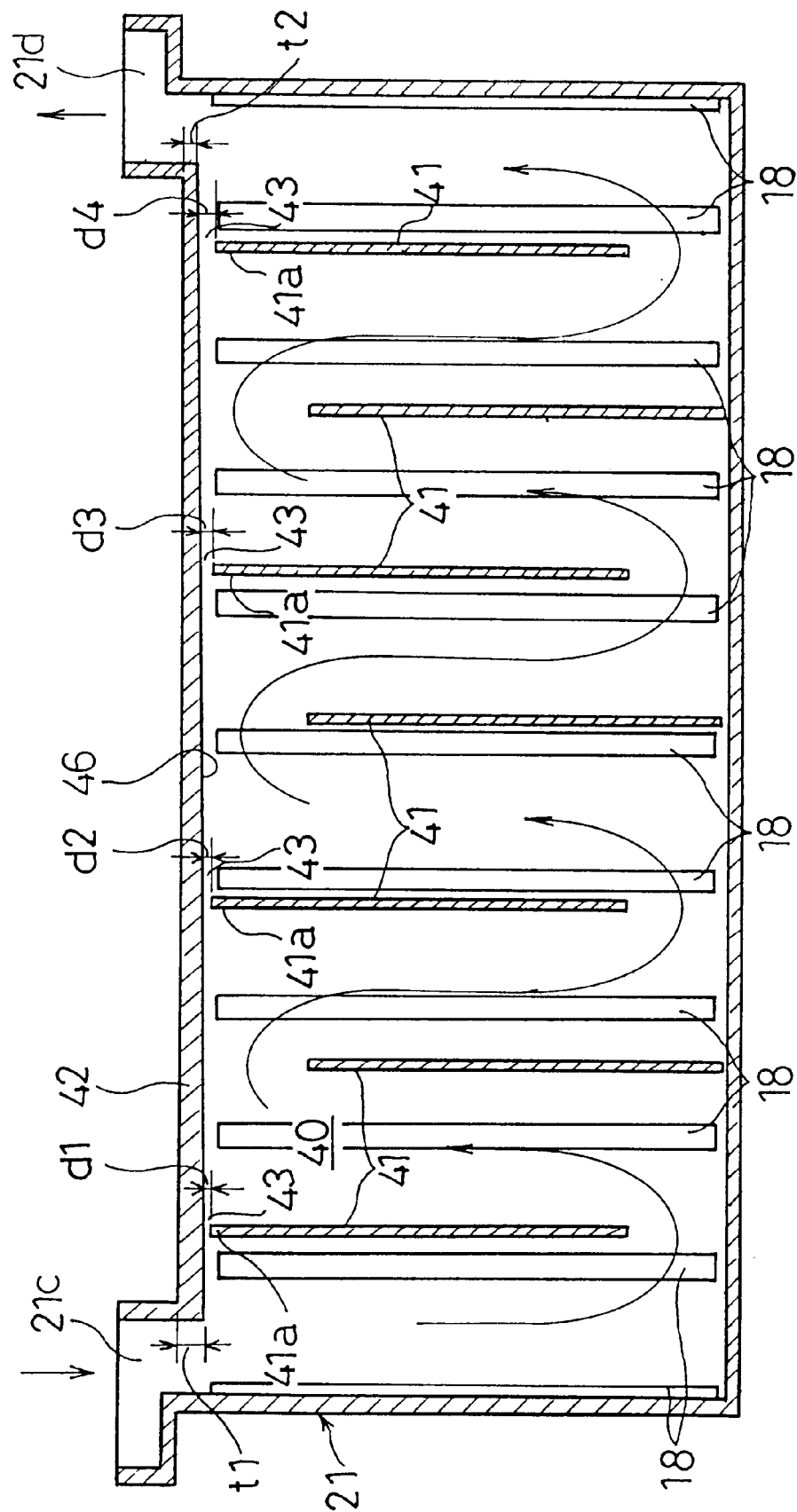
FIG. 14 is a vertical cross-sectional view illustrating the construction of a cooling medium passage of this embodiment.
Figure 15:
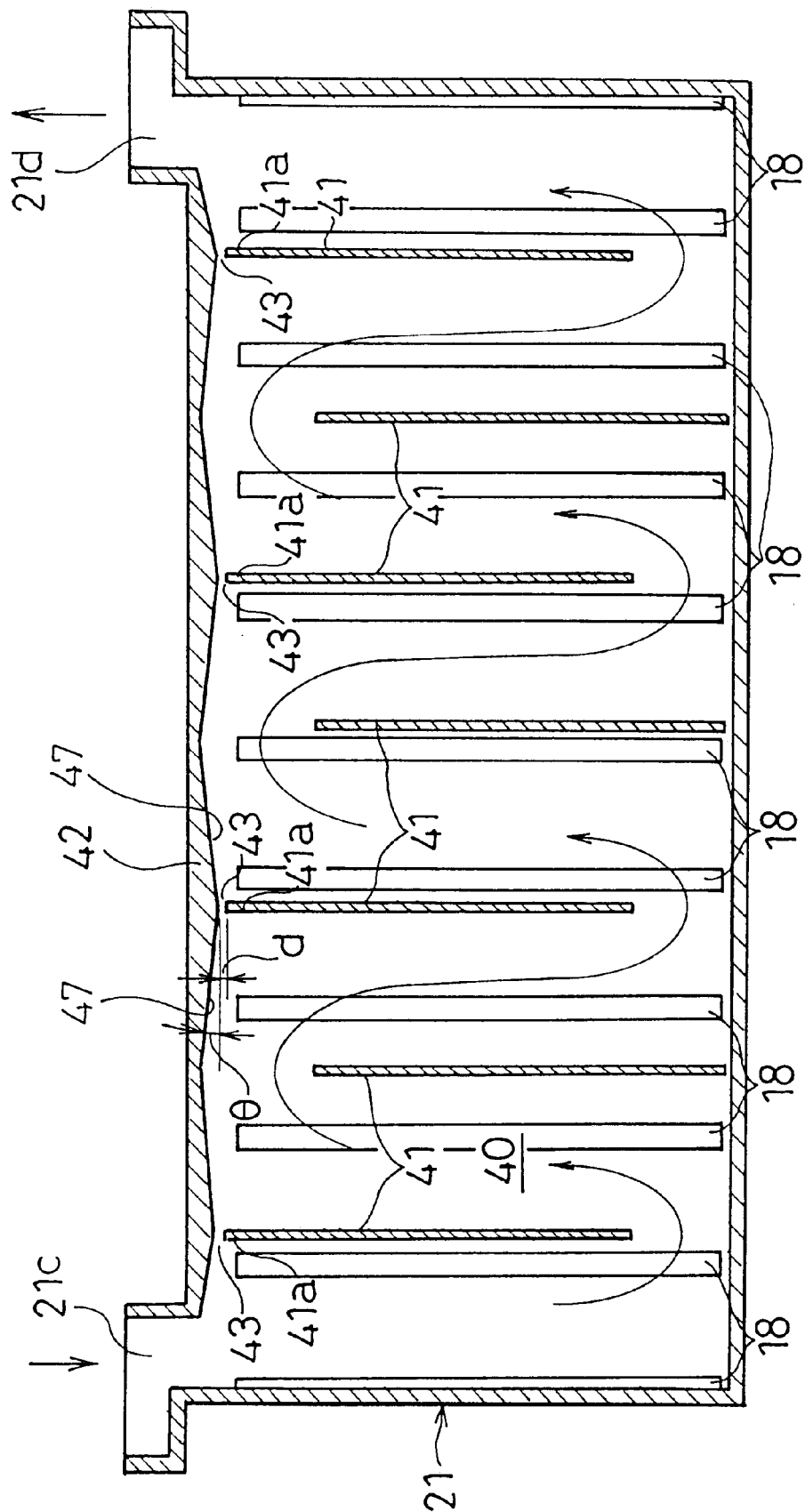
FIG. 15 is a vertical cross-sectional view illustrating another example of the construction within the cooling medium passage of this embodiment.
Figure 16:
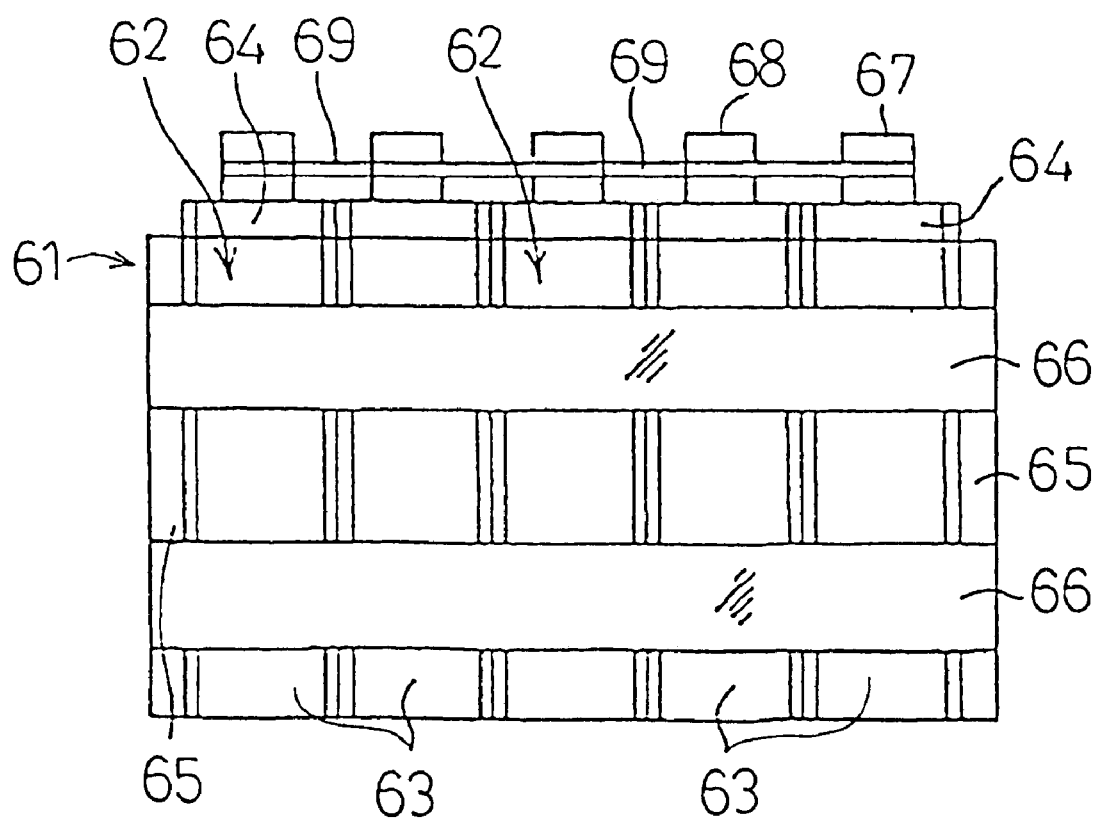
FIG. 16 is a front view of a prior art example of an integrated sealed secondary battery.

Referring now to FIG. 14 and FIG. 15, as has been described above, a meandering flow passage 40 is formed that meanders upwards and downwards so that the cooling medium flows uniformly over the entire surface of the cooling medium passages 21, by the provision of flow-alignment projecting strips 41 on the inside surface of the cooling jacket member 3. Furthermore, air escape apertures 43 are formed between the top wall 42 of the interior of the cooling medium passage 21 and the top end 41a of the flow-alignment projecting strips 41 which extends downwardly from the top wall of the cooling medium passage 21. The thickness t2 of the top wall 42 of the cooling medium passage 21 is set to be smaller on the side nearest the exit end 21d than its thickness t1 on the side nearest the inlet end 21c, so as to form an inclined face 44 that is inclined upwards from the inlet end 21c to the exit end 21d of the cooling medium passage 21, on the inside surface of the top wall 42. on the other hand, the height position of the top end 41a of each of the flow-alignment projecting strips 41 that extend downwards from the top wall of the cooling medium passage 21 is approximately the same height, so that the height dimension of the air escape apertures 43 successively increases from the inlet end 21c of the cooling medium passage 21 to the exit end 21d, as: d1, d2, d3, d4. The height of the air escape apertures d1~d4 should preferably be set about 3 to 5 mm. It should be noted that the flow-alignment projecting strips 41 may also be provided on the side of the cases 14 of the cells 2.

By this arrangement, even if air stagnates in the corners between the top ends 41a of the flow-alignment projecting strips 41 and the top wall 42 of the cooling medium passages 21, this stagnating air is made to flow through the air escape apertures 43 and flow towards the middle of meandering flow passage 40 by the inclined face 46, and, toward downstream by the strong current of cooling medium flowing through the meandering flow passage 40. Any air that was not entrained by the current also successively passes through the air escape apertures 43 along the inclined face 46, until it is smoothly evacuated at the exit end 21d of the cooling medium passage 21. Furthermore, since the aperture dimension of the air escape apertures 43 gradually increases as d1~d4 from the inlet end 21c of the cooling medium passage 21 towards the exit end 21d, outflow of air becomes progressively easier as the downstream end is approached, enabling it to be evacuated even more smoothly from the cooling medium passage 21. Thus, lowering of cooling performance due to stagnation of air within meandering flow passage 40 can be reliably prevented.

Alternatively, inclined faces 47 may be formed in the top wall 42 of the cooling medium passage 21 so as to be inclined upward from portions opposite the air escape apertures 43 towards both sides as shown in FIG. 15. In this case also, any air that stagnates in the corner between the top wall 42 of cooling passage 21 and the top ends 41a of flow-alignment projecting strips 41 can be reliably shifted towards the middle of meandering flow passage 40, where it is entrained by the strong current of cooling medium and so can be evacuated. Consequently, lowering of cooling performance due to air stagnation can be prevented. For the height dimension of the air escape apertures 43, about 3 to 5 mm is preferable, and for the angle of inclination θ of the inclined faces 47 with respect to the horizontal plane, about 3 to 5° is preferable.

According to the present invention, as will be clear from the above description, cooling medium passages are formed on both sides with respect to the direction of arrangement of the cells, and cooling medium passages are also formed between adjacent cell cases such as to communicate with the cooling medium passages on both sides. Further, means for generating pressure difference between both ends of the cooling medium passages between adjacent cell cases are provided, by which cooling medium can be reliably made to flow through the entire cooling medium passages without air stagnation. Moreover, owing to the provision of air escape apertures between the top walls of the cooling medium passages and projecting strips that form meandering flow passages, unfavorable tendency of air stagnation in corner parts of meandering flow passages can be eliminated. Consequently, it can be ensured that all of the cells are effectively cooled.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An integrated sealed secondary battery comprising:
   a plurality of cells arranged in a row respectively accommodating electricity-generating elements within rectangular tubular cases having a bottom, with their upper open ends being sealed;
   first cooling medium passages formed on both a first side and a second side of the row of the cells and having top and bottom walls;
   second cooling medium passages formed between the cases of the cells that communicate with the first cooling medium passages on both the first side and the second side of the row of the cells;
   projection strips provided in the first cooling medium passages such as to alternately extend downwards from the top wall and upwards from the bottom wall of the first cooling medium passages so that the first cooling medium passages meander upwards and downwards; and
   air escape apertures formed between the top wall of the cooling medium passages and top ends of the projection strips that extend downwards from the top wall of the cooling medium passages.

2. The integrated sealed secondary battery according to claim 1 wherein inclined faces are formed on the top walls of the cooling medium passages in at least portions facing the air escape apertures.

3. The integrated sealed secondary battery according to claim 2 wherein the inclined faces are inclined upwards towards both the first side and the second side of the row of cells from the portion opposite the air escape apertures in the top wall of the cooling medium passages.

4. The integrated sealed secondary battery according to claim 3 wherein the angle of inclination of the inclined faces with respect to a horizontal plane is 3 to 5°.

5. The integrated sealed secondary battery according to claim 1 wherein inclined faces are formed on the top walls of the cooling medium passages such as to incline upwards towards an outlet end from an inlet end of the cooling medium passages.

6. The integrated sealed secondary battery according to claim 5 wherein the height positions of the top ends of the flow-alignment strips that extend downwards from the top walls of the cooling medium passages are set substantially the same, so that the area of the air escape apertures is made progressively larger from the inlet end towards the outlet end of the cooling medium passages.

7. The integrated sealed secondary battery according to claim 1 wherein the vertical width of the air escape apertures is 3 to 5 mm.

8. The integrated sealed secondary battery according to claim 1, further comprising means for generating pressure difference between side ends of the second cooling medium passages between the cases.

9. The integrated sealed secondary battery according to claim 1, wherein flow path cross-sectional areas of the first cooling medium passages on both the first side and the second side of the row of cells are mutually different.

10. The integrated sealed secondary battery according to claim 1, wherein opposing wall faces of the cases of the cells are tapered from the first side to the second side of the row of cells whereby the width of the second cooling medium passages between the cases is gradually reduced from the first side to the second side of the row of cells.

11. The integrated sealed secondary battery according to claim 1, wherein the projection strips are provided on both the first side and the second side of the row of cells, the width of opposite cooling medium passages on both the first side and the second side of the row of cells being different from each other.

12. The integrated sealed secondary battery according to claim 11, wherein the thickness of the wall of the cooling medium passages on both the first side and the second side of the row of cells is different whereby the width of opposite first cooling medium passages on both the first side and the second side of the row of cells is different from each other.

13. The integrated sealed secondary battery according to claim 11, wherein a height of the projection strips is different whereby the width of opposite first cooling medium passages on both the first side and the second side of the row of cells is different from each other.

14. The integrated sealed secondary battery according to claim 1, wherein the distance between the projection strips is different alternately and between opposite cooling medium passages.

15. The integrated sealed secondary battery according to claim 1, further comprising:

distribution headers provided at both a third side and a fourth side of the row of cells for distributing and collecting cooling medium in the first cooling medium passages on both the first side and the second side of the row of cells;

an inlet orifice provided in the distribution header at the third side of the row of cells;

an outlet orifice provided in the distribution header at the fourth side of the row of cells; and the distribution headers respectively having connecting ports for communicating with the first cooling medium passages on both the first side and the second side of the row of cells, wherein at least in one of the distribution headers the cross sectional area of the connecting ports are different from each other.

16. The integrated sealed secondary battery according to claim 1, further comprising:

distribution headers provided at both a third side and a fourth side of the row of cells for distributing and collecting cooling medium in the first cooling medium passages on both the first side and the second side of the row of cells;

an inlet orifice provided in the distribution header at the third side of the row of cells; and an outlet orifice provided in the distribution header at the fourth side of the row of cells, wherein at least in one of the distribution headers the distance from the inlet orifice or the outlet orifice to the first cooling medium passages on both the first side and the second side of the row of cells are different from each other.

* * * * *